US011838845B2

(12) United States Patent
Raymond et al.

(10) Patent No.: US 11,838,845 B2
(45) Date of Patent: Dec. 5, 2023

(54) STATE POOLING FOR STATEFUL RE-HOMING IN A DISAGGREGATED RADIO ACCESS NETWORK

(71) Applicant: DISH Wireless L.L.C., Englewood, CO (US)

(72) Inventors: Paul-André Raymond, Reston, VA (US); Ashish Bansal, Frisco, TX (US); Dhaval Mehta, Aldie, VA (US); Manjari Asawa, Cupertino, CA (US)

(73) Assignee: DISH Wireless L.L.C, Littleton, CO (US)

( * ) Notice: Subject to any disclaimer, the term of this patent is extended or adjusted under 35 U.S.C. 154(b) by 141 days.

(21) Appl. No.: 17/375,858

(22) Filed: Jul. 14, 2021

(65) Prior Publication Data
US 2023/0019773 A1    Jan. 19, 2023

(51) Int. Cl.
*H04W 40/02* (2009.01)
(52) U.S. Cl.
CPC .................................. *H04W 40/02* (2013.01)
(58) Field of Classification Search
CPC .... H04W 40/02; H04W 88/085; H04W 24/04
See application file for complete search history.

(56) References Cited

U.S. PATENT DOCUMENTS

2011/0235505 A1    9/2011   Eswara et al.
2022/0272594 A1*   8/2022   Anderson ........... H04L 41/0663

FOREIGN PATENT DOCUMENTS

EP    2 783 547 A1    10/2014
EP    2 993 957 A1    3/2016

OTHER PUBLICATIONS

"Cloud Architecture and Deployment Scenarios for O-RAN Virtualized RAN, " O-RAN.WG6.CAD-v02.01 Technical Report prepared by O-RAN Alliance e. V. Copyright © 2020 by the O-RAN Alliance e.V., 52 pages.
Huff Alexandre et al., "RFT: Scalable and Fault-Tolerant Microservices for the O-RAN Control Plane," 2021 IFIP/IEEE International Symposium on Integrated Network Management (IM), IFIP, May 17, 2021, pp. 402-409, XP033935333 [retrieved on Jun. 23, 2021] sections II and III; figure 1.
International Search Report and Written Opinion for PCT/US2022/037040 dated Nov. 7, 2022, 14 pages.

* cited by examiner

*Primary Examiner* — Marisol Figueroa
(74) *Attorney, Agent, or Firm* — KILPATRICK TOWNSEND & STOCKTON LLP

(57) ABSTRACT

Techniques described herein provide pooling of radio access network (RAN) resources in a disaggregated RAN in a manner that enables dynamic re-homing of RAN functions with minimal disruption to stateful communications. The RAN is a hierarchical arrangement of RAN units, each having an associated state at any given time. A RAN state pooling system (RSPS) is in communication with a pool of the RAN units via a high-speed communication channel. The RSPS is configured to maintain an updated repository of the state information for the RAN units in its serviced pool. In the event of re-homing from a first RAN unit to a second RAN unit in the pool (e.g., due to the first RAN unit failing, becoming overloaded, etc.), the RSPS provides the second RAN unit with the updated state information for the first RAN unit to facilitate a stateful re-homing.

18 Claims, 8 Drawing Sheets

STATE POOLING FOR STATEFUL RE-HOMING IN A DISAGGREGATED RADIO ACCESS NETWORK

FIELD

Embodiments relate generally to communication network architectures; and, more particularly, to dynamically updated state pooling for radio access network (RAN) functions in open RAN architectures to facilitate stateful re-homing.

BACKGROUND

Modern wireless communication networks can be very complex and can be built around complex architectures with large numbers of different types of communication nodes architected to handle rapidly dynamically changing characteristics across the network. Some wireless communication networks have evolved to use virtualized functions, such as by implementing cloud-native network components. Some further advancements seek to disaggregate functions of the network, including disaggregation of the radio access network (RAN) itself. Many network operators, equipment manufacturers, and others have coalesced around development of the so-called "Open RAN," or "O-RAN," which are typically architected according to a hierarchy of centralized units (CUs), distributed units (DU), and radio units (RU). Each CU is coupled with multiple DUs, and each DU is coupled with multiple RUs; such that each RU communicates with a backhaul network infrastructure according to an assigned communication path through a particular DU and CU.

Such disaggregation of the RAN provides a number of features, but also tends to have certain limitations. For example, while disaggregation can yield various efficiencies, it can be difficult to reassign communication paths through most conventional O-RAN architectures. For example, routing of communication through any particular DU and/or CU can become undesirable at any time, based on changes in network characteristics (e.g., due to a malfunction in a RAN node, overloading of a RAN node, servicing or replacement of a RAN node, etc.). However, the O-RAN architecture may not provide a way to dynamically reassign communication paths (i.e., to reroute communications) without dropping current communication sessions using impacted portions of the RAN.

SUMMARY

Embodiments described herein provide pooling of RAN resources in a disaggregated RAN (generally referred to herein as an O-RAN) in a manner that enables dynamic re-homing of RAN functions with minimal disruption to stateful communications. The O-RAN is a hierarchical arrangement of RAN units, such as radio units (RUs), distributed units (DUs), and centralized units (CUs), and each RAN unit has an associated state at any given time. A RAN state pooling system (RSPS) is in communication with a pool of RAN units (e.g., a DU pool) via a high-speed communication channel, and the RSPS is configured to maintain an updated repository of the state information for the RAN units in the pool. In the event of re-homing from a first RAN unit to a second RAN unit in the pool (e.g., due to the first RAN unit failing, becoming overloaded, etc., such that traffic needs to be rerouted to the second RAN unit), the RSPS provides the second RAN unit with the updated state information for the first RAN unit to facilitate a stateful re-homing.

According to one set of embodiments, a system is provided for pooling network functions in an open radio access network (O-RAN) having radio access network (RAN) units arranged in a hierarchy with higher-level RAN units to execute traffic handling for at least a portion of traffic traversing the O-RAN between lower-level RAN units and a backhaul network in accordance with a homing assignment that indicates a respective set of the lower-level RAN units presently homed to each of the higher-level RAN units, each of the RAN units having a respective state that is dynamically updated in accordance with the traffic handling. The system includes: a RAN state pooling system (RSPS), coupled with the higher-level RAN units via one or more high-speed communication channels, to: maintain stored states for the higher-level RAN units, each stored state representing at least a portion of the respective state of an associated one of the higher-level RAN units as dynamically updated in accordance with the traffic handling; receive a re-homing trigger in accordance with an update to the homing assignment, the update indicating that at least the respective set of the lower-level RAN units presently homed to a first of the higher-level RAN units is re-homed to a second of the higher-level RAN units; and provide one or more of the stored states associated with the first of the higher-level RAN units to the second of the higher-level RAN units in accordance with the re-homing trigger.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label (e.g., a lower-case letter) that distinguishes among the similar components. If only the first reference label is used in the specification, the description is applicable to any one of the similar components having the same first reference label irrespective of the second reference label.

DETAILED DESCRIPTION

Embodiments of the disclosed technology will become clearer when reviewed in connection with the description of the figures herein below. In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Modern wireless communication networks can be very complex and can be built around complex architectures. For example, some modern wireless communication networks (e.g., those built around "fourth generation" (4G) and "fifth generation" (5G) standards promulgated by standards setting organizations under the umbrella of the Third Generation Partnership Project (3GPP)) include large numbers of different types of communication nodes architected to handle rapidly dynamically changing characteristics across the network. Some advancements in modern wireless communication networks have involved virtualization of many of the functions in the network, such as within a cloud-native architecture.

Some further advancements seek to disaggregate functions of the network, for example, by providing open (e.g., non-proprietary), interoperable functional interfaces. Traditionally, network operators and equipment providers tended to architect their networks and components with proprietary interfaces, which tended to reduce interoperability, efficiency, visibility, etc. However, in recent years, organizations, like the Small Cell Forum, Telecom Infra Project, and 3GPP have advanced efforts to implement disaggregation across network functions. These efforts have led to increasing development and definition around disaggregation of the radio access network (RAN) itself. In particular, many network operators, equipment manufacturers, and others have coalesced around development of the so-called "Open RAN," or "O-RAN."

Figure 1:
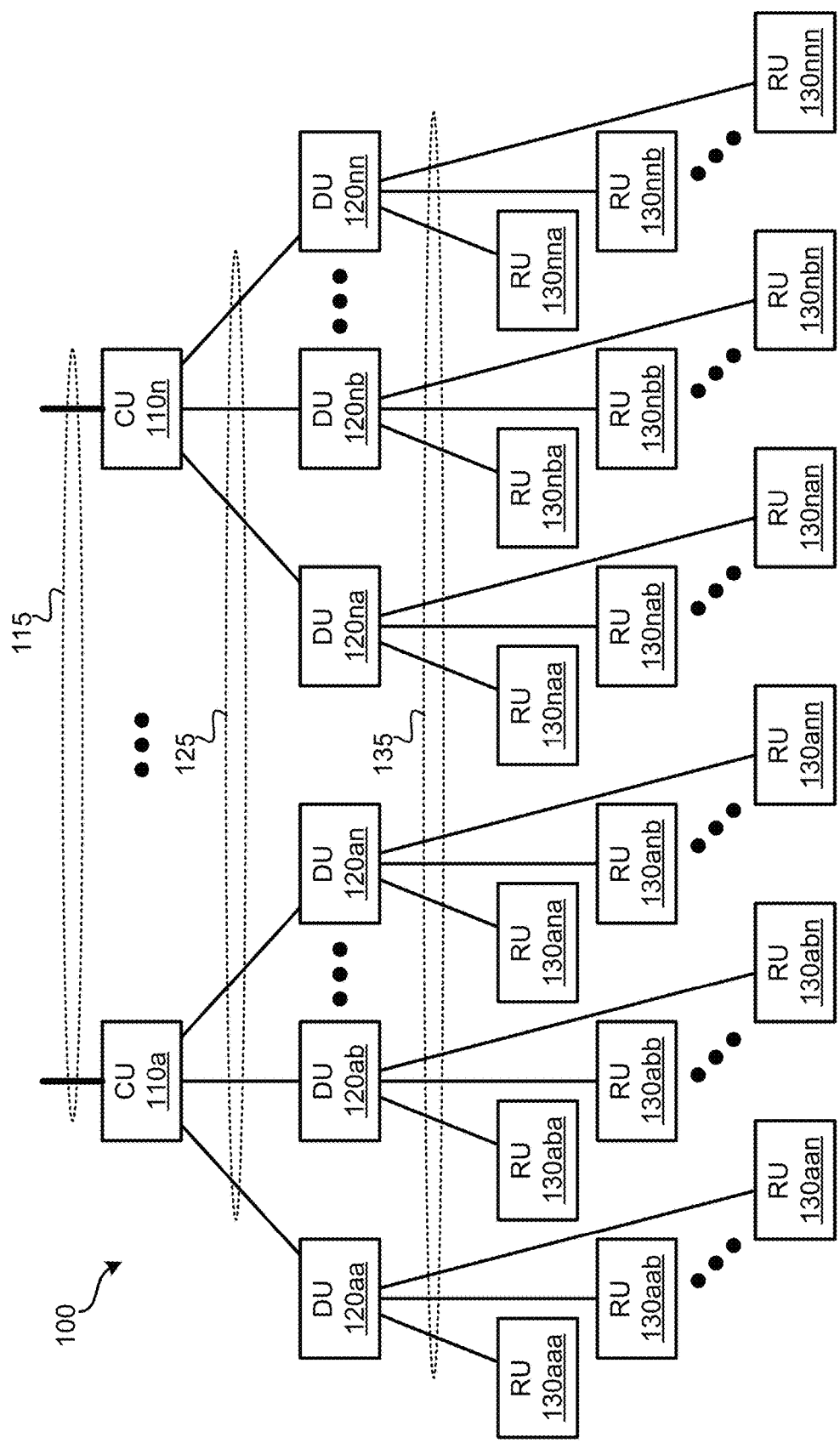
FIG. 1 shows an illustrative conventional disaggregated open radio access network (O-RAN) architecture, for the sake of context.

FIG. 1 shows an illustrative conventional disaggregated O-RAN architecture 100, for the sake of context. One design goal for many modern communication networks is to implement sophisticated technologies to maintain communication sessions, which can rely on network functions that are "stateful." For example, to comply with certain protocols (e.g., as promulgated by 3GPP and others), each network function can be designed to include complex processes to maintain its own state. Another design goal for many modern communication networks is to virtualize network functions, such as in cloud-native implementations. To keep those virtualized network functions as nimble as possible, many cloud native principles tend to drive designs toward stateless implementations of network functions. As such, maintaining of stable sessions can tend to drive network designs toward stateful implementations, and virtualization of network functions can tend to drive network designs away from stateful implementations.

Based on at least these competing considerations, the ORAN alliance and others have promoted conventional O-RAN architectures 100 that include virtual and physical network functions for CUs 110, DUs 120, and RUs 130. As illustrated, the conventional O-RAN architecture 100 includes a hierarchy (e.g., tree structure) of centralized units (CUs) 110, distributed units (DUs) 120, and radio units (RUs) 130. The CUs 110 communicate with a backhaul network infrastructure 115. Each CU 110 also acts as a centralized node for multiple DUs 120, forming so-called midhaul networks 125; and each DU 120, in turn, acts as a centralized node for multiple RUs 130, forming so-called fronthaul networks 135. The relationships between the nodes can be referred to as "homing" assignments. For example, a particular RU 130 can be homed to a particular DU 120, and the particular DU 120 can be homed to a particular CU 110. Such a conventional O-RAN architecture 100 generally uses commercial off-the-shelf (COTS) components to implement the RAN in compliance with open (e.g., non-proprietary and/or highly interoperable) interface standards promulgated by working groups of standard-setting organizations, such as the "O-RAN Alliance."

While such a conventional O-RAN architecture 100 provides a number of features, conventional approaches tend to be limited at least by certain architectural constraints. For example, as noted above, it is desirable to maintain stateful communication sessions across the RAN. Conventionally, implementing such stateful communications involves assigning a fixed path (e.g., fixed homing assignments) from each RU 130 to the backhaul network 115 through a particular DU 120 and a corresponding particular CU 110. Each DU 120, CU 110, and/or other network function can maintain its own state and session information to support the stateful communications. As session-related transactions occur between RAN functions, states of those RAN functions are continually updated, and mismatches between the information among RAN functions can cause service interruptions. For example, detection of a state mismatch between a particular user equipment (UE) and a particular RU 130 (e.g., a "g NodeB," or "gNB") with which it is communicating, the UE session may have to drop and reconnect. Conventionally, the state information maintained by any particular RAN function may not be visible to other network functions and may change rapidly. At any time, however, use of the particular DU 120 and/or CU 110 as part of a communication path through the RAN can become undesirable based on changes in network characteristics. For example, any particular DU and/or CU can malfunction; can become overloaded; can be due for servicing, upgrading, or replacement; etc. In these and/or other cases, the path across the RAN may become sub-optimal, or even unusable, such that stateful communications cannot be maintained (e.g., user connections to the network are dropped).

Some conventional O-RAN architectures 100 tend to address such cases by rerouting communications through a different fixed path (by re-homing RUs 130 to different DUs 120, re-homing DUs 120 to different CUs 110, etc.), where available. For example, thousands of users may be conducting phone calls, streaming media, and/or otherwise engaged in communication sessions via user devices; and those devices are in communication with the backhaul network 115 via RUs 130*aaa*-130*aan*, all of which route traffic through DU 120*aa* and CU 110*a*. During the communication session, DU 120*aa* becomes unavailable, and all the state information relating to DU 120*aa* (e.g., and corresponding session information for those thousands of users' communication sessions) is lost. Components of the network can identify a different path that does not involve DU 120*aa*, and to reestablish dropped communication sessions, where possible. For example, those sessions can be assigned to other communication paths that use one or more other RUs 130 (other than RUs 130*aaa*-130*aan*) coupled with one or more other DUs 120 (other than DU 120*aa*). Rerouting options are typically limited based on various factors, such as relative locations of the RUs 130 to user devices (e.g., whether a wireless communication link can be established), current loads balancing across other nodes of the conventional O-RAN architecture 100, and the particular hierarchical relationships among the nodes of the conventional O-RAN architecture 100.

Various proposals have suggested pooling certain RAN functions to facilitate more flexible rerouting of communication paths through the O-RAN. Some suggested pooling can involve centralization of resources, such as by implementing virtualized RAN function instances in a cloud-native architecture (e.g., Edge Cloud). For example, traffic for a particular RU 130 can be assigned to a particular virtualized DU 120 instance; and, as needed, the same traffic from the same RU 130 can be reassigned to a different virtualized DU 120 instance running in the same cloud-native architecture, as desired. Other suggested pooling facilitates sharing of multiple RAN function resources, such as behind a switching network, or the like. For example, traffic for a particular RU 130 can be dynamically assigned (e.g., routed) through the switching network to any of multiple DU 120 resources; and the same traffic from the same RU 130 can be dynamically reassigned to a different DU 120 resource through the same switching network. Pooling of RAN resources can potentially increase network flexibility, improve load balancing, and/or provide other features. However, cloud native principles conventionally call for stateless implementations to provide sufficiently nimble virtualized functions. Thus, while the pooling-based rerouting of RU 130 traffic is used to reestablish dropped communication sessions and/or to establish new communication sessions, reassignment of the routing path causes stateful communication sessions to be dropped and corresponding state information to be lost.

Embodiments described herein provide state-pooled O-RAN architectures, which seek to pool RAN resources in a disaggregated RAN (generally referred to herein as an O-RAN) in a manner that enables dynamic rerouting with minimal disruption to stateful communications. Techniques can be applied to pooling of resources in a 5G RAN, such as to pooling of CU 110, DU 120, RAN intelligent controller (MC), and/or other RAN resources. Embodiments can provide various features, such as enhanced reliability (e.g., enabling smooth take-over of a RAN function in response to failure of a RAN component), availability (e.g., reducing downtime due to maintenance operations and/or rearrangement of RAN resources), and efficiency (e.g., improving sharing of compute and/or networking resources).

Figure 2:
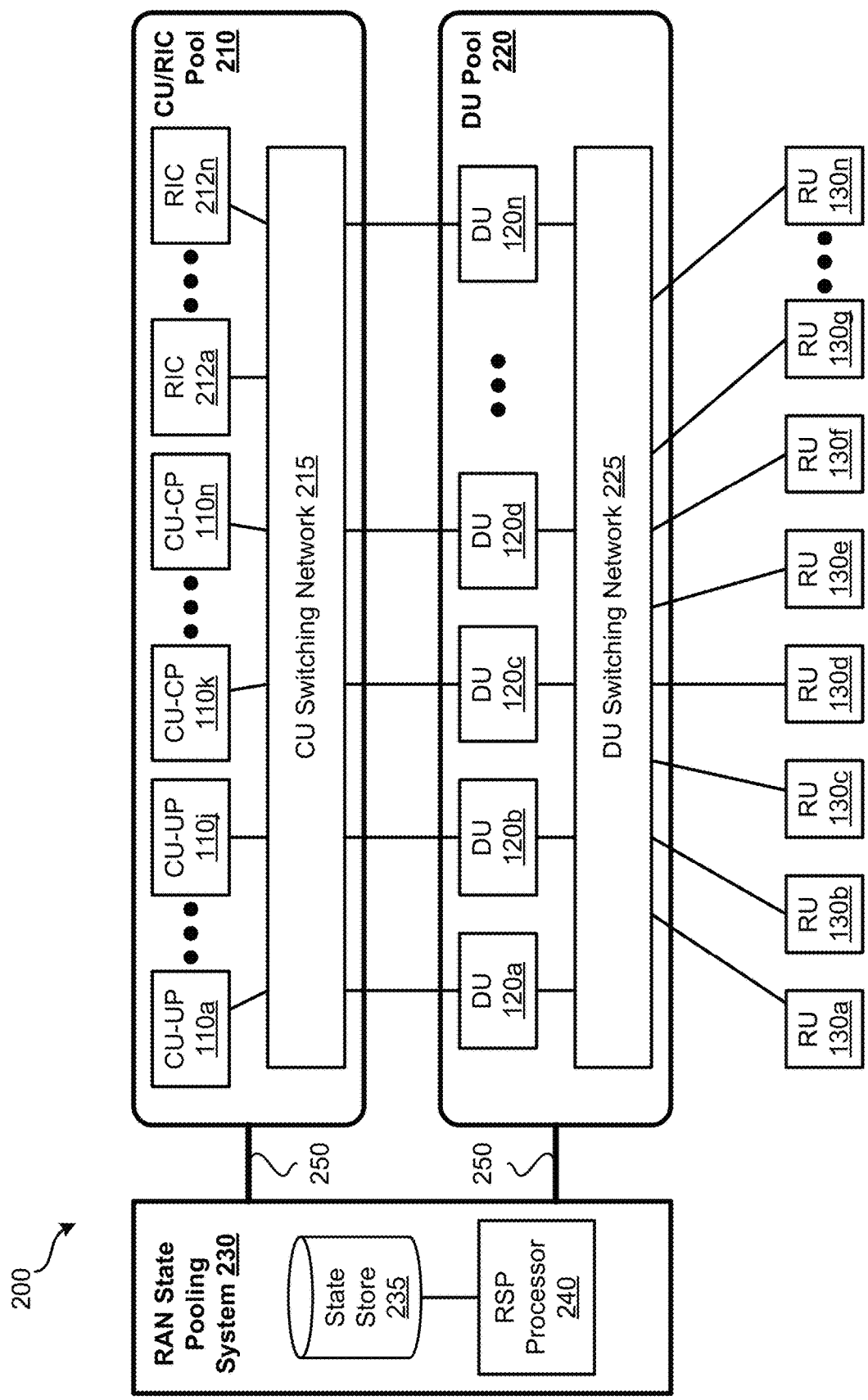
FIG. 2 shows an illustrative state-pooled O-RAN architecture, according to various embodiments described herein.

FIG. 2 shows an illustrative state-pooled O-RAN architecture 200, according to various embodiments described herein. As illustrated, the state-pooled O-RAN architecture 200 includes one or more layers of pooled network function resources, and a RAN state pooling system (RSPS) 230. One layer of pooled network function resources is illustrated as a DU pool 220 that is a pool of DU 120 network functions behind a DU switching function 225. Another layer of pooled network function resources is illustrated as a CU/RIC pool 210 that can be a pool of CU 110 network functions (e.g., including CU user plane (CU-UP) and/or CU control plane (CU-CP) functions), RAN intelligent controller (MC) 212 functions (e.g., including real-time RIC and/or non-real-time MC functions), and/or other network functions behind a CU switching function 215. While both a DU pool 220 and a CU/RIC pool 210 are shown, some implementations can have only a DU pool 220 (e.g., with non-pooled CU 110 resources), only a CU/RIC pool 210 (e.g., with non-pooled DU 120 resources), a CU/RIC pool 210 with only pooled CU 110 resources (e.g., without pooling MC 212 resources), a CU/RIC pool 210 with only pooled MC 212 resources (e.g., without pooling CU 110 resources), etc.

Embodiments of the RSPS 230 provide a persistent and fast repository for storing state information of RAN functions. The RSPS 230 is coupled with one or more of the RAN function pools by a high-speed (high-throughput, low-latency) communication channel 250, such as dedicated fiber-optics. While the RSPS 230 is illustrated as coupled with both the DU pool 220 and the CU/RIC pool 210, some embodiments may couple the RSPS 230 only with one, or fewer than all, pools of RAN functions. In embodiments that couple the RSPS 230 with multiple RAN function pools, each pool can be associated with one or more RSPS 230. In some implementations, each RSPS 230 is implemented separately. For example, a first RSPS 230 is coupled with the DU resource pool 220 via a first high-speed communication channel 250, and a second RSPS 230 is coupled with the CU/RIC pool 210 by a second high-speed communication channel 250. In other implementations, some or all RSPSs 230 are implemented as a pooled resource. For example, multiple RSPSs 230 for multiple RAN function pools are centralized in a shared hardware environment, in a cloud-native framework, or in any other suitable manner. In some embodiments, the RSPS 230 is implemented as part of the RAN function pool or pools served by the RSPS 230. For example, for a DU pool 220, the RSPS 230 can be implemented as one or more separate components of the DU pool 220, as a distributed function implemented by some or all of the DUs 120, as a function of the DU switching network 225, and/or in any other suitable manner.

Embodiments of the RSPS 230 include a state store 235 and a RAN state pooling (RSP) processor 240. The state store 235 can include any suitable persistent (e.g., non-transient, processor-readable) memory or memories suitable for storage of full or partial state information of the coupled RAN function pool or pools. For example, the state store 235 can include remote storage (e.g., a remote server), distributed storage (e.g., cloud-based storage), local storage (e.g., one or more solid-state drives). The RSP processor 240 can orchestrate various features of the RSPS 230, as described herein. For example, the RSP processor 240 detects a re-homing condition and directs a stateful resource transition. The RSP processor 240 can include one or more central processing units (CPUs), application-specific integrated circuits (ASICs), application-specific instruction-set processors (ASIPs), digital signal processors (DSPs), field-programmable gate arrays (FPGAs), programmable logic devices (PLDs), controllers, microcontroller units, reduced instruction set (RISC) processors, a complex instruction set (CISC) processors, microprocessors, or the like, or any combination thereof.

Different RAN functions can maintain different types of state information, and different types of state information can change at different rates. The RSPS 230 is implemented with components capable of ensuring that the RSPS 230 can maintain updated state information across all the RAN functions it supports. For example, much of the state information can change at sub-microsecond rates, and the state store(s) 235, RSP processor(s) 240, and high-speed communication channel(s) 250 of the one or more RSPSs 230 are selected and architected to support such high-speed updates across a large number of RAN functions (e.g., across a large pool of DUs 120). Even embodiments largely assembled with multiple commercial off-the-shelf (COTS) components are designed to include the high-speed communication channel(s) 250 and specific configurations and architectures to ensure that state information can be stored and retrieved at very high speeds with very low latency.

FIGS. 3-6 show various example implementations of state-pooled O-RAN architectures having different RSPS 230 implementations. The state-pooled O-RAN architecture in each of FIGS. 3-6 is illustrated to include a large number of RUs 130 in communication with a DU pool 220 (e.g., via one or more fronthaul networks), which is in communication with a CU/RIC pool 210 (e.g., via one or more midhaul networks). In each illustrated state-pooled O-RAN architecture, the RSPS 230 is shown as supporting RAN state pooling for a DU pool 220, and components of the DU pool 220 are shown to add clarity to the various implementations.

Though each illustrated state-pooled O-RAN architecture is illustrated as having a CU/RIC pool 210, the CUs 130, RICs 212, and/or other RAN functions may not be implemented in RAN function pools. For example, the DUs 120 may be implemented as a DU pool 220 with DU state-pooling implemented by the RSPS 230, while other resources are not pooled and are not supported by the RSPS 230. In other implementations, some or all other RAN functions (other than the DUs 120) are pooled (e.g., as one or more CU/RIC pools 210), but may not be supported by an RSPS 230. For example, a CU/RIC pool 210 may be used to facilitate flexible and dynamic, but not stateful re-homing.

Additionally or alternatively, each RSPS 230 implementation described in FIGS. 3-6 can be configured to support RAN state pooling for a CU/RIC pool 210. For example, in each implementation, the RSPS 230 can be implemented in, or in communication with, the CU/RIC pool 210. Such implementations may or may not also support RAN state pooling for a DU pool 220. For example, an embodiment can use any of the implementations of FIGS. 3-6 to support RAN resource pooling for a pool of CU 110 resources, and some or all other resources (e.g., including DUs 120, RICs 212, etc.) may not be pooled and/or may not support stateful re-homing.

Figure 3:
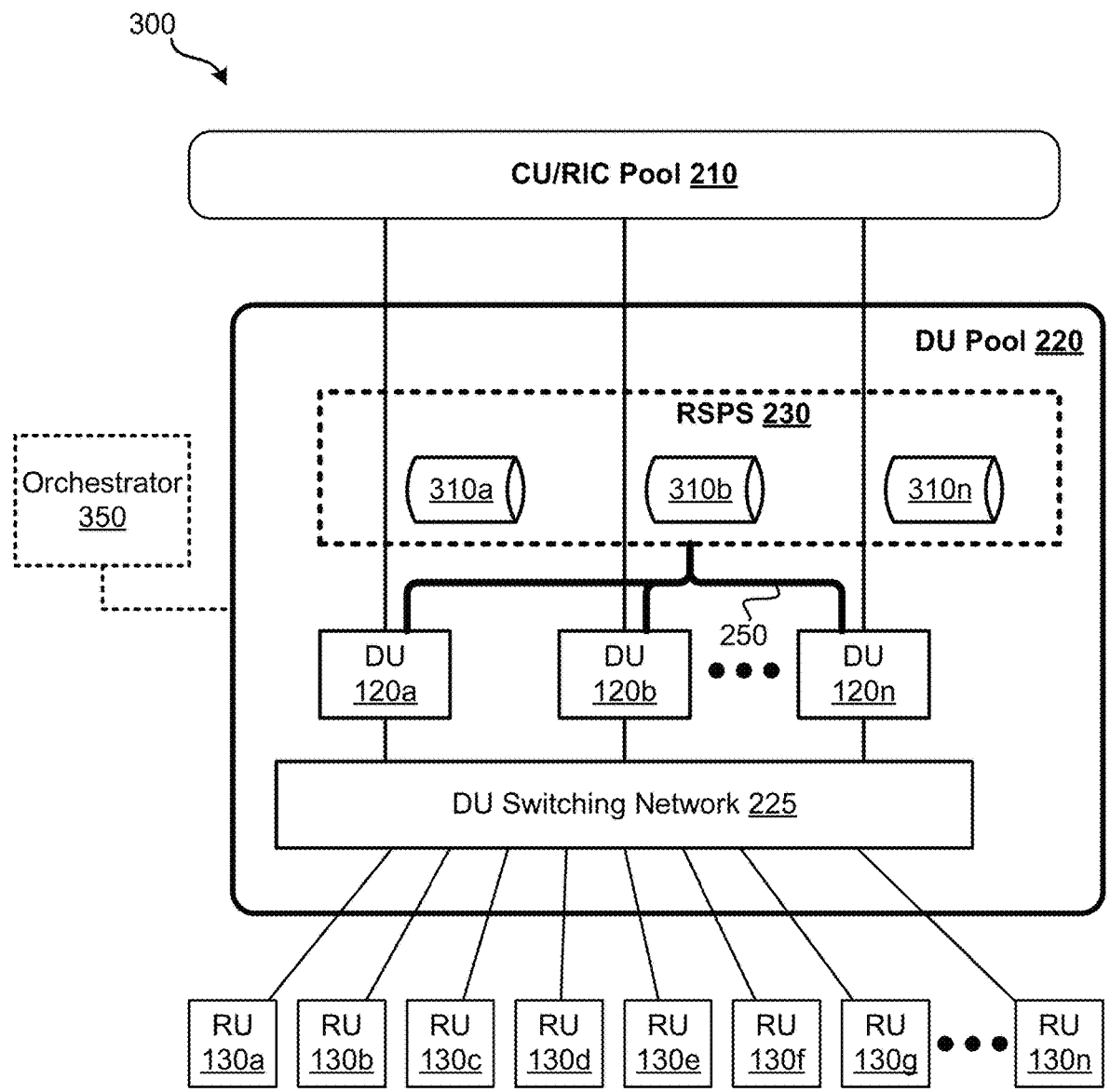
FIG. 3 shows an illustrative state-pooled O-RAN architecture with a RAN state pooling system (RSPS) configured for distributed unit (DU) level state pooling, according to various embodiments described herein.

FIG. 3 shows an illustrative state-pooled O-RAN architecture 300 with a RSPS 230 configured for DU-level state pooling, according to various embodiments described herein. As described with reference to FIG. 2, the DU pool 220 includes a number of DUs 120 (e.g., virtualized DU resources) behind a DU switching network 225. A large number of RUs 130 is in communication with the DU switching network 225, such that any RU 130 can be quickly and dynamically re-homed to any of the DUs 120 through the DU switching network 225. For example, an orchestrator 350 in the RAN periodically or dynamically generates homing solutions to maintain desired operation of the RAN (e.g., to maintain load balancing, to respond to RAN function outages or issues, etc.); and the orchestrator can direct the DU pool 220 (e.g., the DU switching network 225) to re-home RUs 130 to DUs 120, as needed, according to the present homing solution. While the orchestrator 350 is shown as a separate component, some embodiments can implement the orchestrator 350 as part of the DU pool 220, or in any manner.

As described above, the DU switching network 225 in the DU pool 220 can direct and re-direct traffic from RUs 130 to DUs 120 depending on a present homing solution (e.g., as directed by the orchestrator 350). While the DU switching network 225 facilitates fast re-homing from a source DU (e.g., DU 120a) to a target DU (e.g., DU 120b), conventional O-RAN approaches tend to drop sessions and/or experience other undesirable impacts during such re-homing, at least because the state information of the source DU is not conventionally available to the target DU. In the illustrated state-pooled O-RAN architecture 300, the RSPS 230 is implemented as part of the DU pool 220. The RSPS 230 maintains at least partial state information of the various DUs 120 of the DU pool 220. For example, if RUs 130 are re-homed from DU 120a to DU 120b, the RSPS 230 can be used to make some or all state information for DU 120a available to DU 120b, so that DU 120b can take over with minimal impact to stateful communication functions (e.g., without dropping stateful sessions).

Such implementation of the RSPS 230 as "part of the DU pool 220" can be realized by establishing high-speed communication channels 250 between each DU 120 and the RSPS 230. Each high-speed communication channel 250 can be implemented as any communication channel with sufficiently high bandwidth and speed. For example, the high-speed communication channel 250 can be implemented as one or more dedicated high-bandwidth, low-latency communication channels, such as one or more fiber-optic cables, high-speed data buses, etc. In some implementations, each DU 120 is implemented in its own computational environment; the RSPS 230 is implemented in a separate computational environment; and high-speed communication channels 250 are used to couple each DU 120 with the RSPS 230. In some implementations, groups of DUs 120 (e.g., some or all DUs 120) are centralized in a shared computational environment, such as by implementing multiple virtualized DU 120 instances using hardware resources of a first computational environment; the RSPS 230 is implemented using separate computational hardware of a second computational environment; and high-speed communication channels 250 are used to couple the first and second computational environments. In some implementations, one or more DUs 120 and the RSPS are implemented as components of a same computational environment coupled together by high-speed communication channels 250 (e.g., high-speed cables, buses, etc.).

Though not explicitly shown to avoid overcomplicating the illustration, the RSPS 230 includes the state store 235 and the RSP processor 240, as described with reference to FIG. 2. In the DU-level state pooling implementation of FIG. 3, a respective stored state 310 is maintained in the state store 235 to represent a full or partial state of each DU 120 of the supported DU pool 220. For example, each of stored state 310a-310n corresponds to full or partial state information for each of DU 120a-120n, respectively. The stored state 310 for any particular DU 120 can be dynamic and complex. In some cases, the stored state 310 for a DU 120 can be updated in accordance with each new frame that is received from a RU 130 over the fronthaul network (e.g. via the Common Public Radio Interface (CPRI), or enhanced CPRI (eCPRI)). In some cases, the stored state 310 for a DU 120 can be updated in accordance with each packet that is received from a CU 110 over the midhaul network. In some cases, the stored state 310 for a DU 120 can be updated in accordance with performance of physical layer (PHY) functions, such as processing raw core data, creating so-called "IQ samples" for each cell, etc., which can generate new data at sub-millisecond, sub-microsecond, or even faster speeds. In some cases, each DU 120 is managing multiple RUs 130 (e.g., multiple cells, etc.), and the stored state 310 can be maintained and updated for each cell. For example, the stored state 310 can indicate, for each RU 130, information used by the DU 120 for management of PHY layer functions, medium access control (MAC) layer functions, radio link control (RLC) layer functions, and/or other functions. In some cases, multiple devices (user equipment, or UE) can be communicating with any particular RU 130 at a time, and/or any particular RU 130 can be supporting multiple sessions at a time; and the stored state 310 for a DU 120 can be maintained at the UE level and/or the session level. For example, the stored state 310 for any particular DU 120 can indicate respective states of the PHY layer, MAC layer, RLC timers, packet sequence, retransmissions, acknowledgement and negative acknowledgment (ACK/NACK) transmissions, etc. for each supported UE. In some cases, the stored state 310 for any particular DU 120 can indicate information used by a scheduler state machine of the DU 120 that tracks users, data flows and radio resource assignments in the DU 120 buffer that are currently active, scheduled, remaining, etc. In some embodiments, the state store 235 maintains stored states 310 at an amount and/or complexity level that supports practical updating at a fast enough speed. For example, stored states 310 can be handled in accordance with various types of DU 120 implementations, such as so-called stateful DUs, cached-state DUs, partial-state DUs, stateless DUs, etc.

Embodiments of the RSPS 230 can detect a re-homing trigger associated with re-homing of one or more of its supported DUs 120, and the RSPS 230 can support stateful implementation of the re-homing. In one implementation, the re-homing trigger is received directly from the orchestrator 350 in association with the orchestrator 350 generating an updated homing solution and directing a corresponding re-homing. In another implementation, the re-homing trigger is received by the RSPS 230 from the DU switching network 225. For example, the DU switching network 225 receives instructions from the orchestrator 350 for re-homing one or more RUs 130 in accordance with an updated homing solution, and, in response, the DU switching network 225 generates and send a re-homing trigger to the RSPS 230 to facilitate stateful re-homing. In another implementation, the re-homing trigger is received by the RSPS 230 from one or more DUs 120. For example, DU 120*b* is instructed (e.g., by the orchestrator 350, by the DU switching network 225, etc.) to take over some or all communications and related functions being handled for DU 120*a*, and, in response, DU 120*b* generates and send a re-homing trigger to the RSPS 230 to facilitate stateful re-homing (e.g., to provide 120*b* with at least relevant portions of stored state 310*a*).

The state-pooled O-RAN architecture 300 of FIG. 3 can be implemented in various ways. In some implementations, some or all DUs 120 are implemented as stateful virtual functions with their respective state information with state information duplicated into the RSPS 230 as respective stored states 310. In other implementations (e.g., a more cloud-native implementation), each of some or all of the DUs 120 is implemented in two parts: a stateless virtual functions containing logic to implement the DU functions; and state information stored in the RSPS 230. Some embodiments can implement a hybrid approach by which some state information for each DU 120 is stored in the DU 120 (e.g., in a local cache), and some state information is stored in the RSPS 230. Certain of the information can be duplicated. For example, some state information can be stored in a local cache of the DU 120 and is duplicated in the RSPS 230, while other of the state information is stored only in the RSPS 230 and is accessible by the DU 120. In general, use of the RSPS 230 to maintain stored states 310 of DUs 120 does not preclude maintenance of the same and/or additional state information by the DUs 120 themselves (e.g., in local caches).

Figure 4:
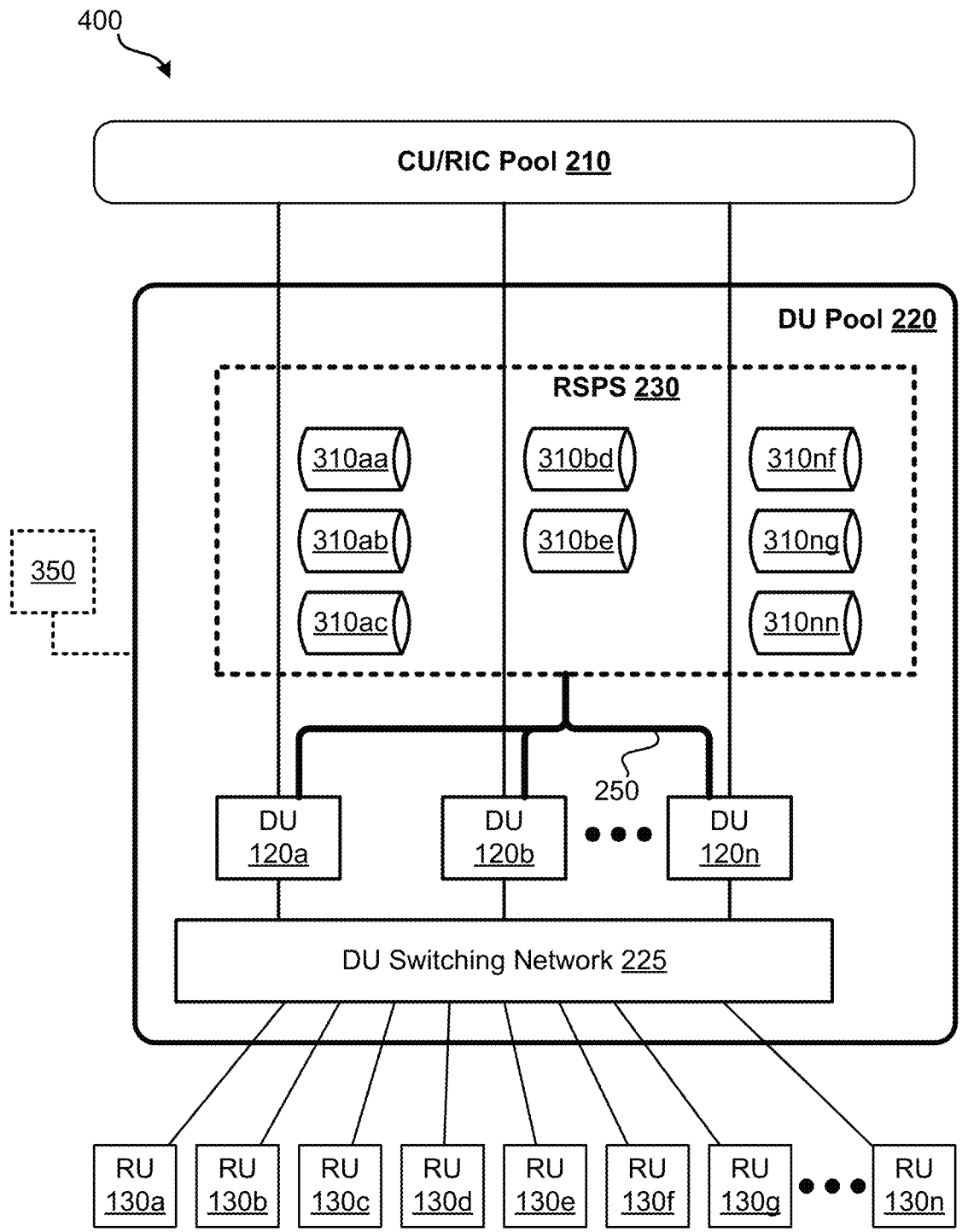
FIG. 4 shows an illustrative state-pooled O-RAN architecture with a RSPS configured for radio unit (RU) level state pooling, according to various embodiments described herein.

As noted above, the state-pooled O-RAN architecture 300 of FIG. 3 provides DU-level state pooling. FIG. 4 shows an illustrative state-pooled O-RAN architecture 400 with a RSPS 230 configured for RU-level state pooling, according to various embodiments described herein. The state-pooled O-RAN architecture 400 of FIG. 4 can be implemented substantially as the state-pooled O-RAN architecture 300, except that the RSPS 230 is configured to maintain stored states 310 at the RU 130 level. In some embodiments, the RSPS 230 is implemented as a background permanent storage function with each DU 120 maintaining a cache of state information for each of the RUs 130 it is currently serving. Embodiments of the RSPS 230 can be configured to be responsible for synchronization of the cached information in each DU 120 (e.g., or virtualized DU instance) with the stored states 310 centrally stored in the RSPS 230.

As illustrated in FIG. 4, the RSPS 230 can include a respective stored state 310 for each RU 130 as it relates to a presently homed DU 120. For example, stored state 310*aa* can represent the stored state 310 for RU 130*a* as presently homed to DU 120*a* (i.e., the state information last written by DU 120*a* about its communications with RU 130*a* and sessions relating to RU 130*a*); similarly, stored state 310*ab* can represent the stored state 310 for RU 130*b* as presently homed to DU 120*a*, stored state 310*nf* can represent the stored state 310 for RU 130*f* as presently homed to DU 120*n*, etc. Additionally or alternatively, the stored states 310 at the RSPS 230 can include UE state and context information, as well as RU 130 state and context information.

Figure 5:
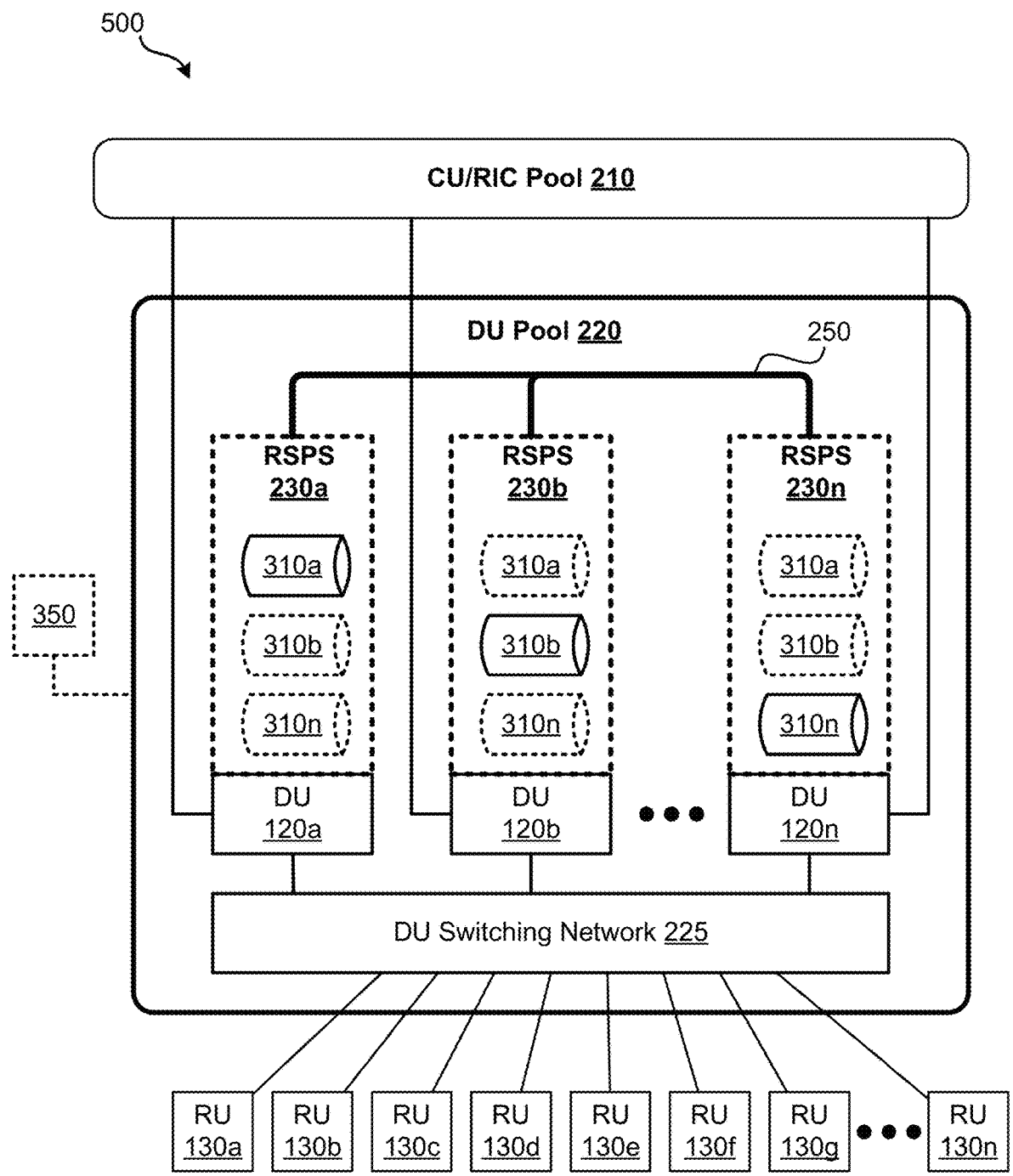
FIG. 5 shows an illustrative state-pooled O-RAN architecture with a RSPS configured as a distributed database, according to various embodiments described herein.

FIG. 5 shows an illustrative state-pooled O-RAN architecture 500 with a RSPS 230 configured as a distributed database, according to various embodiments described herein. The state-pooled O-RAN architecture 500 of FIG. 5 can otherwise be implemented substantially as any of the state-pooled O-RAN architectures of FIG. 3 or 4. In the illustrated implementation, the RSPS 230 is not implemented as a standalone function. Instead, the RSPS 230 is implemented as a distributed function, for example, with instances running on the same computational hardware environment or environments (e.g., same server computers) as each of the DUs 120. In some such implementations, the RSPS 230 is a distributed database that leverages a fast transmission bus (i.e., to implement high-speed communication channels 250) to distribute stored state 310 information between instances. In such implementations, stored states 310 can be replicated very quickly among multiple (e.g., some or all) hardware environments, so that each DU 120 can access stored states 310 for each other (or at least some other) DUs 120 very quickly and efficiently. In some embodiments, though not explicitly shown, one or more additional high-speed communication channels 250 couples the RSPS 230 with the DU switching network 225.

In the illustrated embodiment, each DU 120 (or virtual instance of a DU 120) shares a hardware environment with an associated portion (e.g., sub-instance, instance, etc.) of the distributed RSPS 230. Each portion of the distributed RSPS 230 stores the state information of its associated DU 120 and the state information of at least one other (e.g., or all other) DUs 120 in the DU pool 220. For example, a first portion of the distributed RSPS 230 is implemented in a shared environment with DU 120a, maintains a stored state 310a for DU 120a, and also maintains one or more of stored states 310b-310n corresponding to DUs 120b-120n. In some embodiments, the RSP processor 240 (not explicitly shown) maintains the proper allocation of stored states 310 substantially in real time, for example, by enforcing data replication rules in the RSPS 230 in accordance with present homing solutions (e.g., based on enforcement of rules from the orchestrator 350 or other component), and/or responsive to a re-homing trigger.

Figure 6:
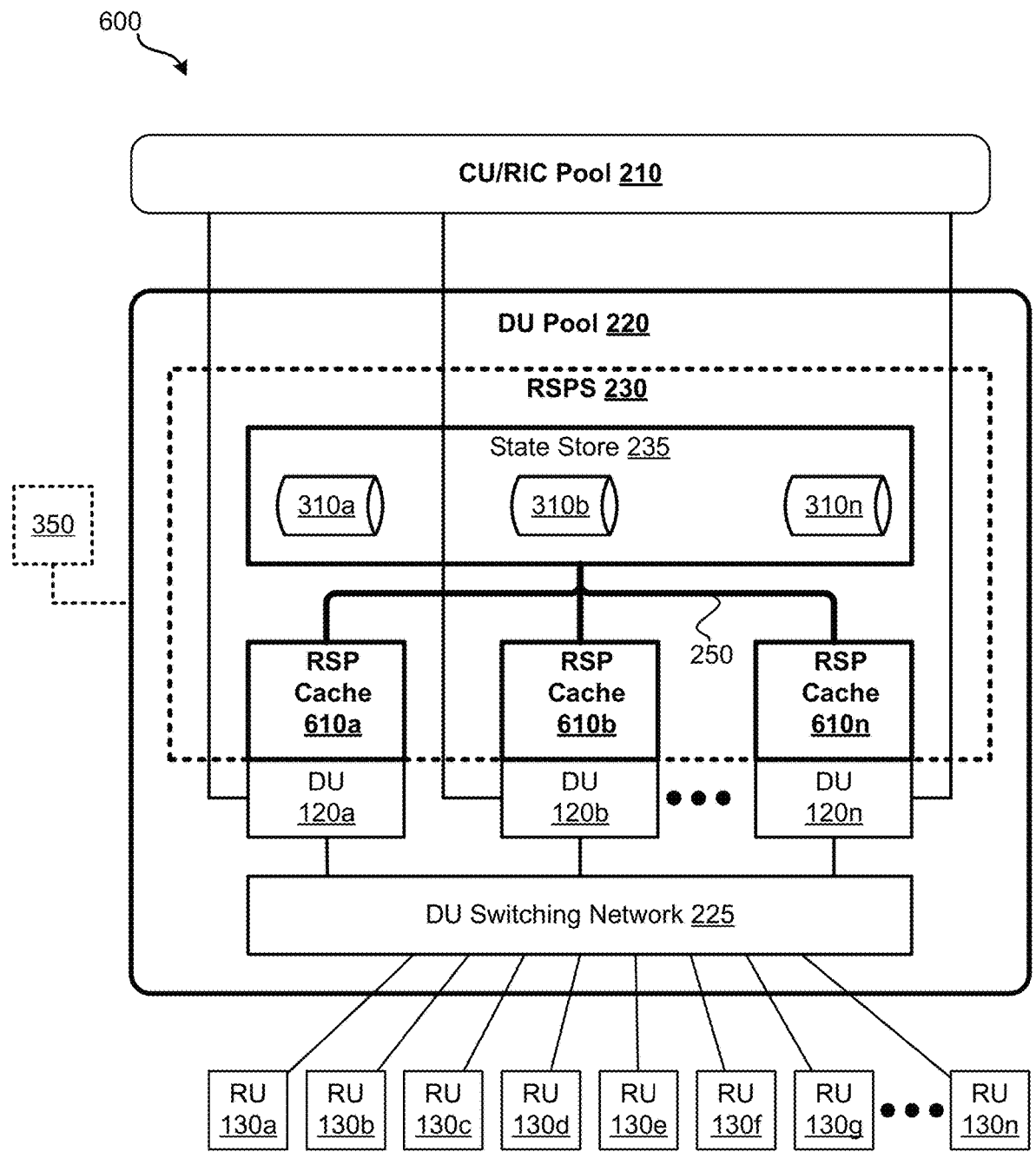
FIG. 6 shows an illustrative state-pooled O-RAN architecture with a cache-mode RSPS configuration, according to various embodiments described herein.

FIG. 6 shows an illustrative state-pooled O-RAN architecture 600 with a cache-mode RSPS 230 configuration, according to various embodiments described herein. The state-pooled O-RAN architecture 600 of FIG. 6 can otherwise be implemented substantially as any of the state-pooled O-RAN architectures of FIGS. 3-5. In the illustrated implementation, the RSPS 230 implemented the state store 235 in a centralized node, and also includes a respective RAN state pooling (RSP) cache 610 implemented local to each DU 120 (e.g., implemented in a same hardware environment as its associated DU 120). For example, each RSP cache 610 can be implemented as a library within its associated DU 120, as a "sidecar" to its associated DU 120, and/or in any other suitable manner.

The centralized state store 235 is coupled with the RSP caches 610 via one or more high-speed communication channels 250. For example, the high-speed communication channel 250 may not be fast enough in some cases to support substantially real time updating of the stored states 310 only in a centralized RSPS 230. In such cases, local state information can be maintained in a respective local RSP cache 610 of each DU 120 (e.g., and/or other RAN functions), and the RSP processor 240 can work in the background to capture the locally cached state information in the RSP caches 610 and to transfer the captured information to update corresponding stored states 310 in the centralized state store 235. The RSP processor 240 can effectively handle synchronization of state information, distribution of stored states 310, and other state information management functions. For example, management of state information management functions can be the responsibility of the RSPS 230, and not of the DUs 120; or the responsibility can be shared.

The various state-pooled O-RAN architectures of FIGS. 2-6 each implement a RSPS 230 to effectively pool RAN function state information. As described herein, pooling the state information in the RSPS 230 can mitigate impacts to stateful communications during re-homing. Embodiments described above can be modified to provide additional features. In some embodiments, the RSPS 230 can be implemented as part of an element management system (EMS). In a communication network, an EMS can be used to manage the functions of one or more of a particular type of network element (NE). EMSs can typically interface with higher level network management functions to manage traffic flow between NEs. Implementing the RSPS 230 in combination with an EMS can facilitate maintaining a repository of configuration information for each RAN function along with the stored state 310 for that RAN function. With some such implementations, RAN functions can be implemented without relying on separate micro-services that are conventionally used by the RAN functions to maintain their own performance and/or status information and to handle configuration changes. Instead, by using the RSPS 230, such configuration changes can be applied directly in the RSPS 230, and at least some of the performance and/or status information typically obtained by the EMS directly from the RAN functions can be recovered directly from the RSPS 230 instead. This can improve performance of the RAN functions, for example, by conserving memory and processor cycles.

Another modification to embodiments described herein involves using the RSPS 230 to capture traffic (e.g., packets, frames, etc.) going to and/or from RAN functions. As described above, different amounts and/or types of state information can be maintained in the RSPS 230. Capturing more state information can facilitate smoother re-homing, better preservation of stateful sessions, etc. However, much of the state information can be highly dynamic, and reliably maintaining an updated repository of large amounts of, and/or more real-time types of state information can involve building and maintaining very fast and reliable infrastructures. For example, the value of capturing additional state information can relate to balancing marginal costs of building and maintaining more capable infrastructure against marginal benefits to efficiency, resilience, capability, etc. In some cases, it is determined to be of sufficient value to implement the RSPS 230 with an infrastructure capable of capturing at least some of the traffic going to and/or from RAN functions.

For example, when a DU 120a receives an eCPRI frame from an RU 130, it takes a short, but non-zero amount of time before that frame is translated into updated state information at the DU 120a. If the DU 120a were to fail an instant after the frame is received, but before the state is updated, a re-homed DU 120b would try to recover the state of DU 120a without knowing about the last-received frame. Using the RSPS 230 to capture traffic in and/or out of the DU 120a as part of the stored state 310a can enable DU 120b to recover both the last-saved state of DU 120a and all the communications that DU 120a had sent and/or received since that state was saved.

In some implementations, duplication of frames and/or packets is performed using a specialized network interface control (NIC) that has a dedicated interface to the RSPS 230. For example, each RAN function supported by the RSPS 230 can have its own instance of the NIC. In other implementations, standard NICs at the RAN functions (e.g., at each DU 120) and/or at the switching network for the pool (e.g., the DU switching network 225) are configured to interface with the RSPS 230 using a port mirroring function, or the like. It can be seen from the example above that some functions may only rely on capturing a small amount of traffic, such as only the small amount of traffic to and/or from the RAN function since the stored state 310 for that RAN function was last updated. As such, only a small amount of additional storage may be used at the state store 235 to capture enough traffic to allow a re-homed RAN function to more accurately restore state information from a previously homed (e.g., now-failed) RAN function. Some embodiments provided herein describe a distributed implementation of the RSPS 230. In some such distributed implementations, traffic from RAN functions in a pool (e.g., DUs 120 of a DU pool 220) can be captured on the switching network (e.g., DU switching network 225).

Figure 7:
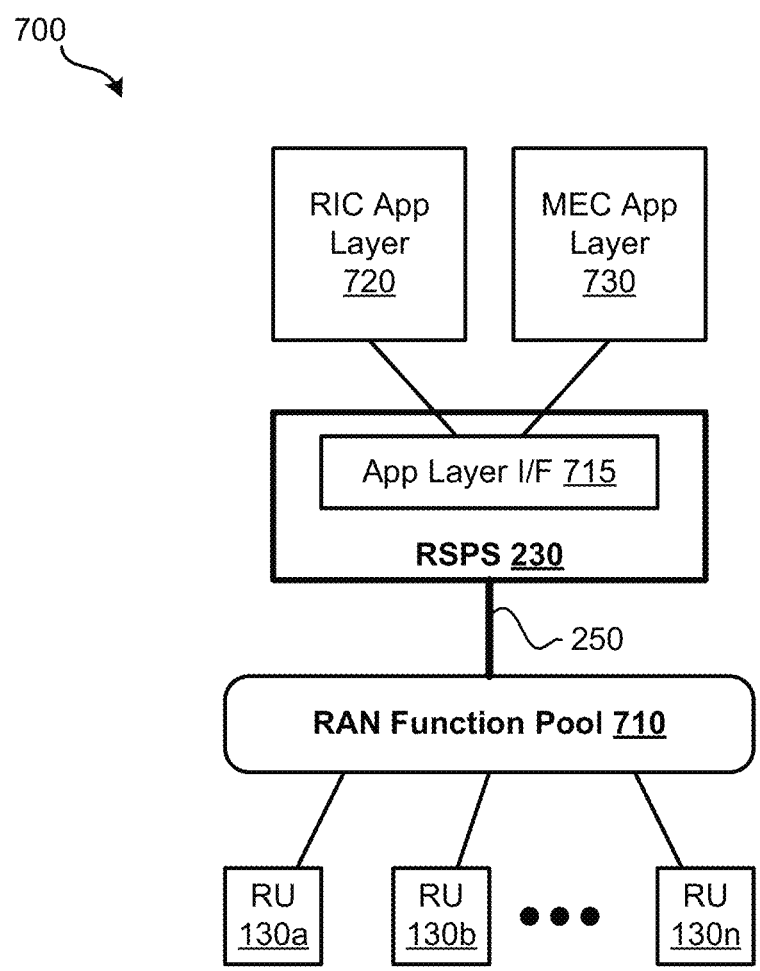
FIG. 7 shows an example network environment having a RSPS interfacing with both one or more RAN function pools and one or more network function application layers, according to various embodiments.

In some embodiments, pooling state information in the RSPS 230 can provide additional features, such as by providing other network functions with access to a repository of state information without having to interface with the RAN functions themselves. FIG. 7 shows an example network environment 700 having a RSPS 230 interfacing with both one or more RAN function pools 710 and one or more network function application layers, according to various embodiments. The illustrated RAN function pool 710 generally represents any suitable RAN function pool or pools to be serviced by one or more RSPSs 230, such as one or more DU pools 220, CU/RIC pools 210, etc. For added context, a number of RUs 130 are illustrated in communication with the RAN function pool 710. As illustrated, the RSPS 230 can include an application layer interface 715 to interface with one or more network function application layers. For example, the application layer interface 715 can include one or more application programming interfaces (APIs), data abstraction layers, etc.

In some embodiments of such a network environment 700, the RSPS 230 application layer interface 715 can interface with a RIC application layer 720. O-RAN architectures, standards, etc. are developed to facilitate development and deployment of various types of applications. In context of the RIC application layer 720, some applications (referred to as "xAPP") can be developed for deployment on the "near-real-time" RIC, and other applications (referred to as "rAPP") can be developed for deployment on the "non-real-time" RIC. Such applications can involve plain programming logic, artificial intelligence (AI) and/or machine learning (ML) programming, and/or any other suitable application programming. Conventionally, xAPP, rAPP, and/or other RIC applications leverage inputs coming from other 0-RAN components through O-RAN interfaces, such as through DU interfaces (e.g., DUs 120), CU-UP and CU-CP interfaces (e.g., CUs 110), RIC interfaces (e.g., RIC 212), service management and orchestrator (SMO) interfaces (e.g., orchestrator 350), etc.

By pooling the state information from those RAN functions in the RSPS 230, xAPP, rAPP, and/or other RIC applications can obtain inputs from the RSPS 230 without consuming interface resources of the RAN functions. For example, the RAN functions can focus compute resources on their respective functions in the O-RAN (e.g., as relating to the "new radio" (NR) stack in 5G networks) without spending processor cycles figuring out what updates are useful and sending those updates to the RIC. Another feature of such an implementation is that the applications of the MC application layer 720 (e.g., xAPP and/or rAPP) can be informed much more quickly of changes in the state of any particular cell (e.g., changes in the number of users in a cell, noise level in a cell, etc.) by obtaining state information from the repository of the RSPS 230. Another feature of such an implementation is that applications of the RIC application layer 720 (e.g., xAPP and/or rAPP) can, themselves, leverage the RSPS 230 to store their state information, their data, their model, etc. This can facilitate more cloud-native, stateless implementation of RIC applications.

In some embodiments of such a network environment 700, the RSPS 230 application layer interface 715 can additionally, or alternatively interface with a mobile edge computing (MEC) application layer 730. The MEC application layer 730 can include applications running at or near cell sites (e.g., at or near RUs 130). One feature of such embodiments is that the MEC application layer 730 can use the RSPS 230 as a fast and resilient storage to facilitate more cloud-native, stateless implementation of the MEC platform and/or MEC applications. For example, state information relevant to the MEC platform and/or applications is stored on the RSPS 230, and the RSPS 230 effectively provides high performance (e.g., high speed, high availability, high resilience) storage and recovery. Another feature of such embodiments is that the MEC application layer 730 can leverage the state information available in the RSPS 230 to offer APIs with additional sources of information for applications in the MEC application layer 730. For example, some conventional networks provide the MEC application layer 730 with access to European Telecommunications Standards Institute (ETSI) APIs, radio network information service (RNIS) APIs, location APIs, and other APIs; and the rich state information stored in the RSPS 230 provides additional data opportunities for MEC applications.

Figure 8:
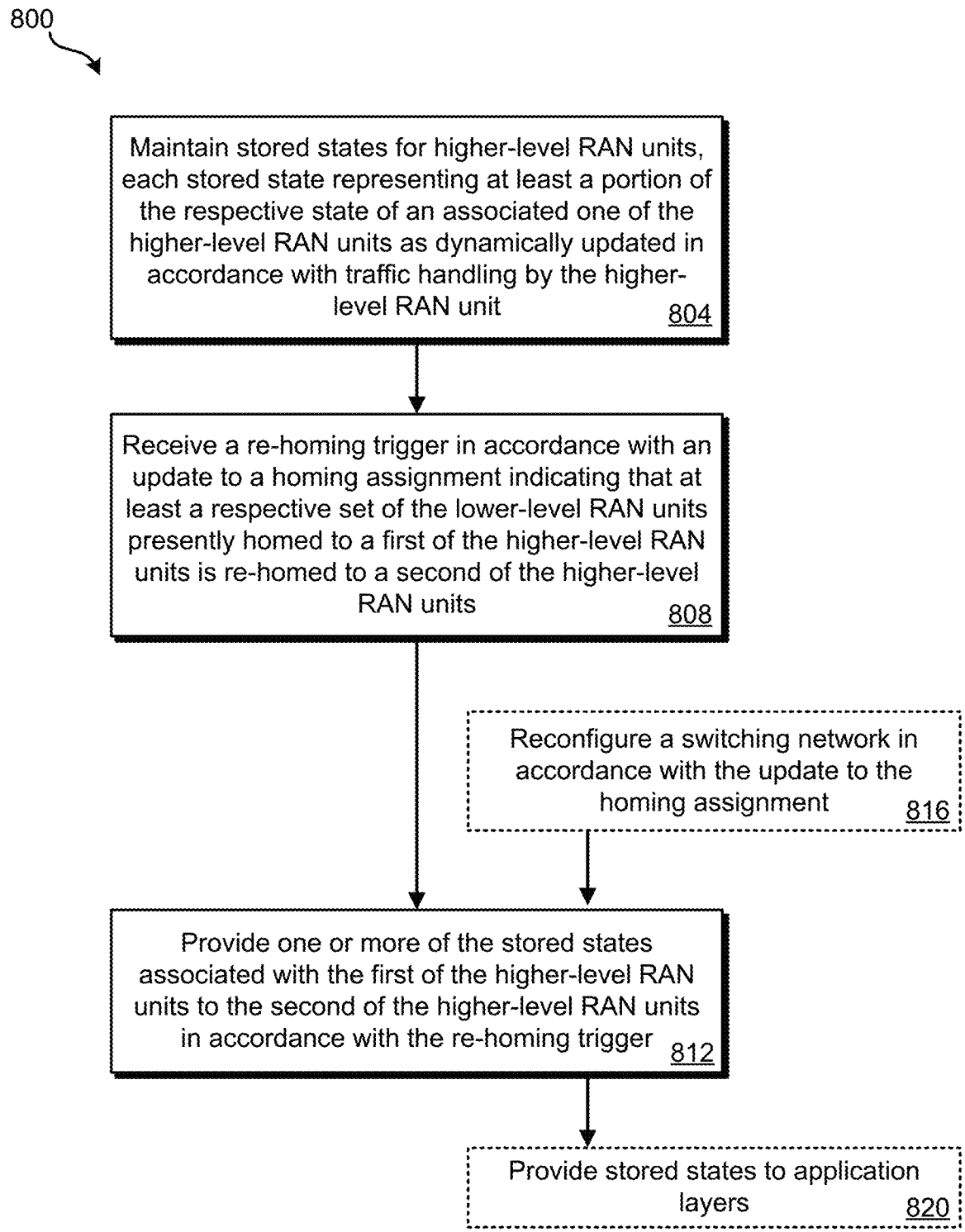
FIG. 8 shows a flow diagram of an illustrative method for pooling network functions in an O-RAN, according to various embodiments.

FIG. 8 shows a flow diagram of an illustrative method 800 for pooling network functions in an O-RAN, according to various embodiments. As described herein, the O-RAN can have radio access network (RAN) units (also called RAN functions herein) arranged in a hierarchy (e.g., a tree structure) with higher-level RAN units to execute traffic handling for at least a portion of traffic traversing the O-RAN between lower-level RAN units and a backhaul network. For example, the higher-level RAN units can be DUs and the lower-level RAN units can be RUs; or the higher-level RAN units can be CUs (or RICs), and the lower-level RAN units can be DUs. Traffic can traverse the network through the various RAN units in accordance with a homing assignment (e.g., from an orchestrator) that indicates interconnections of the hierarchical structure. At each level of the hierarchy, the homing assignment can indicate a respective set of the lower-level RAN units presently homed to each of the higher-level RAN units. For example, at one level of the hierarchy, the homing assignment can indicate respective groups of RUs presently homed to each DU. As described herein, each of the RAN units has a respective state that is dynamically updated in accordance with the traffic handling (e.g., at least its own portion of the traffic handling.

Embodiments of the method 800 can begin at stage 804 by maintaining (e.g., by a RSPS coupled with the higher-level RAN units via one or more high-speed communication channels), stored states for the higher-level RAN units. Each stored state represents at least a portion of the respective state of an associated one of the higher-level RAN units as dynamically updated in accordance with the traffic handling. In some embodiments, maintaining the stored states at stage 804 involves maintaining, for each higher-level RAN unit, a set of stored states that each represents at least a partial state for the higher-level RAN unit in relation to a respective one of the lower-level RAN units presently homed thereto. In some embodiments, each higher-level RAN unit is associated with a respective portion of the traffic that traverses the O-RAN through the higher-level RAN; and the maintaining at stage 804 can include maintaining, for each higher-level RAN unit, periodically updated state information for the higher-level RAN and changes to the respective portion of the traffic associated with the higher-level RAN since a last update was made to the periodically updated state information. For example, ten RUs can be homed to a same DU, and the stored state for the DU can include at least a set of ten stored states, each corresponding to the state of the DU with respect to one of the ten RUs.

At stage 808, embodiments can receive (e.g., by the RSPS) a re-homing trigger in accordance with an update to the homing assignment. The update can indicate that at least the respective set of the lower-level RAN units presently homed to a first of the higher-level RAN units is being re-homed to a second of the higher-level RAN units. As described herein, the re-homing trigger can be generated by an orchestrator as part of generating an updated homing assignment. Alternatively, the re-homing trigger can be generated by an impacted one of the higher-level RAN units (e.g., the higher-level RAN unit that is taking over based on the re-homing), by the switching network of the resource pool, etc.

At stage 812, embodiments can provide (e.g., by the RSPS) one or more of the stored states associated with the first of the higher-level RAN units to the second of the higher-level RAN units in accordance with the re-homing trigger. Some embodiments include, at stage 816, reconfiguring a switching network disposed in the O-RAN in accordance with the update to the homing assignment. The reconfiguring can be, such that: prior to the update, each of at least the respective set of the lower-level RAN units is communicatively coupled with the first of the higher-level RAN units via the switching network; and responsive to the update, each of at least the respective set of the lower-level RAN units is communicatively coupled with the second of the higher-level RAN units via the switching network. In such embodiments, the providing at stage 812 can be performed further in accordance with the executing the reconfiguring. For example, as part of the reconfiguring, the second of the higher-level RAN unit can request most recent state information of the first of the higher-level RAN units, and that most recent state information can be provided by (e.g., pulled from, pushed by, etc.) the RSPS.

Some embodiments, at stage 820, can receive a request for requested state information of the stored states via an application layer interface of the RSPS from an application layer of at least one other platform of the O-RAN. For example, the request can come from applications of a RIC, a MEC platform, etc. Such embodiments can provide the requested state information to the requesting application layer via the application layer interface in response to the request.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A system for pooling network functions in an open radio access network (O-RAN) having a plurality of radio access network (RAN) units arranged in a hierarchy with a plurality of higher-level RAN units to execute traffic handling for at least a portion of traffic traversing the O-RAN between a plurality of lower-level RAN units and a backhaul network in accordance with a homing assignment that indicates a respective set of the lower-level RAN units presently homed to each of the higher-level RAN units, each of the RAN units having a respective state that is dynamically updated in accordance with the traffic handling, the system comprising:

a RAN state pooling system (RSPS), coupled with the plurality of higher-level RAN units via one or more high-speed communication channels, to:
  maintain stored states for the plurality of higher-level RAN units, each stored state representing at least a portion of the respective state of an associated one of the higher-level RAN units as dynamically updated in accordance with the traffic handling,
  wherein, for each higher-level RAN unit of the plurality of higher-level RAN units, the higher-level RAN unit is associated with a respective portion of the traffic that traverses the O-RAN through the higher-level RAN, and the RSPS is to maintain the stored states such that a respective one or more of the stored states for the higher-level RAN includes periodically updated state information for the higher-level RAN and changes to the respective portion of the traffic associated with the higher-level RAN since a last update was made to the periodically updated state information;
  receive a re-homing trigger in accordance with an update to the homing assignment, the update indicating that at least the respective set of the lower-level RAN units presently homed to a first of the higher-level RAN units is re-homed to a second of the higher-level RAN units; and
  provide one or more of the stored states associated with the first of the higher-level RAN units to the second of the higher-level RAN units in accordance with the re-homing trigger.

2. The system of claim 1, wherein the RSPS comprises:
a state store having each of the stored states persistently stored thereon in association with the associated one of the higher-level RAN units; and
a RAN state pooling (RSP) processor to receive the re-homing trigger and to provide the one or more of the stored states associated with the first of the higher-level RAN units to the second of the higher-level RAN units in accordance with the re-homing trigger.

3. The system of claim 1, further comprising:
a switching network disposed in the O-RAN to provide dynamically configurable communicative coupling between the plurality of lower-level RAN units and the plurality of higher-level RAN units in accordance with the homing assignment, such that:
prior to the update, each of at least the respective set of the lower-level RAN units is communicatively coupled with the first of the higher-level RAN units; and
responsive to the update, the switching network executes re-homing of at least the respective set of the lower-level RAN units to the second of the higher-level RAN units by communicatively coupling each of at least the respective set of the lower-level RAN units with the second of the higher-level RAN units,
wherein the RSPS is to provide the one of the stored states associated with the first of the higher-level RAN units to the second of the higher-level RAN units further in accordance with the switching network executing the re-homing.

4. The system of claim 1, wherein:
the stored states include, for each higher-level RAN unit, a set of stored states that each represents at least a partial state for the higher-level RAN unit in relation to a respective one of the lower-level RAN units presently homed thereto.

5. The system of claim 1, wherein:
the plurality of higher-level RAN units is distributed over a plurality of computational environments, such that each computational environment implements an associated one or more of the plurality of higher-level RAN units; and
the RSPS comprises a plurality of distributed RSPS instances, each implemented in an associated one of the plurality of computational environments, such that each of the plurality of distributed RSPS instances maintains the stored states for the associated one or more of the plurality of higher-level RAN units in the associated one of the plurality of computational environments and maintains the stored states for the associated one or more of the plurality of higher-level RAN units in at least one other of the plurality of computational environments.

6. The system of claim 5, wherein each of the plurality of distributed RSPS instances maintains the stored states for all of the plurality of higher-level RAN units in all of the plurality of computational environments.

7. The system of claim 1, wherein:
the plurality of higher-level RAN units is distributed over a plurality of computational environments, such that each computational environment implements an associated one or more of the plurality of higher-level RAN units;
the RSPS comprises a plurality of RAN state pooling (RSP) caches, each implemented in an associated one of the plurality of computational environments to cache at least a partial state of the associated one or more of the plurality of higher-level RAN units in the associated one of the plurality of computational environments; and
the RSPS further comprises a centralized state store coupled with the plurality of RSP caches by via the one or more high-speed communication channels to maintain the stored states for the plurality of higher-level RAN units by receiving at least the partial states from the RSP caches.

8. The system of claim 1, wherein the RSPS comprises an application layer interface via which to provide the stored states to an application layer of a RAN intelligent controller (RIC) of the O-RAN.

9. The system of claim 1, wherein the RSPS comprises an application layer interface via which to provide the stored states to an application layer of a mobile edge computing (MEC) platform of the O-RAN.

10. The system of claim 1, wherein:
each of the plurality of higher-level RAN units is a distributed unit (DU) of the O-RAN; and
each of the plurality of lower-level RAN units is a radio unit (RU) of the O-RAN.

11. The system of claim 1, wherein:
each of the plurality of higher-level RAN units is a centralized unit (CU) of the O-RAN; and
each of the plurality of lower-level RAN units is a distributed unit (DU) of the O-RAN.

12. The system of claim 1, wherein each of the plurality of higher-level RAN units is a RAN intelligent controller (RIC) of the O-RAN.

13. A method for pooling network functions in an open radio access network (O-RAN) having a plurality of radio access network (RAN) units arranged in a hierarchy with a plurality of higher-level RAN to execute traffic handling for at least a portion of traffic traversing the O-RAN between a plurality of lower-level RAN units and a backhaul network in accordance with a homing assignment that indicates a respective set of the lower-level RAN units presently homed to each of the higher-level RAN units, each of the RAN units having a respective state that is dynamically updated in accordance with the traffic handling, the method comprising:
maintaining, by a RAN state pooling system (RSPS) coupled with the plurality of higher-level RAN units via one or more high-speed communication channels, stored states for the plurality of higher-level RAN units, each stored state representing at least a portion of the respective state of an associated one of the higher-level RAN units as dynamically updated in accordance with the traffic handling,
wherein each higher-level RAN unit is associated with a respective portion of the traffic that traverses the O-RAN through the higher-level RAN, and the maintained stored states for each higher-level RAN unit include periodically updated state information for the higher-level RAN and changes to the respective portion of the traffic associated with the higher-level RAN since a last update was made to the periodically updated state information;
receiving, by the RSPS, a re-homing trigger in accordance with an update to the homing assignment, the update indicating that at least the respective set of the lower-level RAN units presently homed to a first of the higher-level RAN units is re-homed to a second of the higher-level RAN units; and
providing one or more of the stored states associated with the first of the higher-level RAN units, by the RSPS to the second of the higher-level RAN units, in accordance with the re-homing trigger.

14. The method of claim 13, further comprising:
reconfiguring a switching network disposed in the O-RAN, in accordance with the update to the homing assignment, such that:
prior to the update, each of at least the respective set of the lower-level RAN units is communicatively coupled with the first of the higher-level RAN units via the switching network; and responsive to the update, each of at least the respective set of the lower-level RAN units is communicatively coupled with the second of the higher-level RAN units via the switching network,
wherein the providing the one or more of the stored states is further in accordance with the executing the reconfiguring.

15. The method of claim 13, wherein the maintaining the stored states comprises maintaining, for each higher-level RAN unit, a set of stored states that each represents at least a partial state for the higher-level RAN unit in relation to a respective one of the lower-level RAN units presently homed thereto.

16. The method of claim 13, further comprising:
receiving a request for requested state information of the stored states, the request received via an application layer interface of the RSPS from an application layer of at least one of a RAN intelligent controller (MC) of the O-RAN or a mobile edge computing (MEC) platform of the O-RAN; and
providing the requested state information to the application layer via the application layer interface in response to the request.

17. The method of claim 13, wherein:
each of the plurality of higher-level RAN units is a distributed unit (DU) of the O-RAN; and
each of the plurality of lower-level RAN units is a radio unit (RU) of the O-RAN.

18. The method of claim 13, wherein:
each of the plurality of higher-level RAN units is one of: a centralized unit user plane (CU-UP), a centralized unit control plane (CU-CP), or a RAN intelligent controller (RIC) of the O-RAN.

* * * * *

UNITED STATES PATENT AND TRADEMARK OFFICE
CERTIFICATE OF CORRECTION

| | | |
|---|---|---|
| PATENT NO. | : 11,838,845 B2 | |
| APPLICATION NO. | : 17/375858 | |
| DATED | : December 5, 2023 | |
| INVENTOR(S) | : Paul-André Raymond et al. | |

It is certified that error appears in the above-identified patent and that said Letters Patent is hereby corrected as shown below:

In the Claims

In Claim 16, Column 20, Line 1, please delete "(MC)" and insert -- (RIC) --

Signed and Sealed this
Seventh Day of May, 2024

Katherine Kelly Vidal
*Director of the United States Patent and Trademark Office*